Jan. 17, 1961  LE ROY V. JACOBSEN  2,968,185
WHEEL BALANCING MACHINE
Filed Nov. 29, 1957  2 Sheets-Sheet 1

INVENTOR.
L. V. JACOBSEN
BY
ATTORNEY

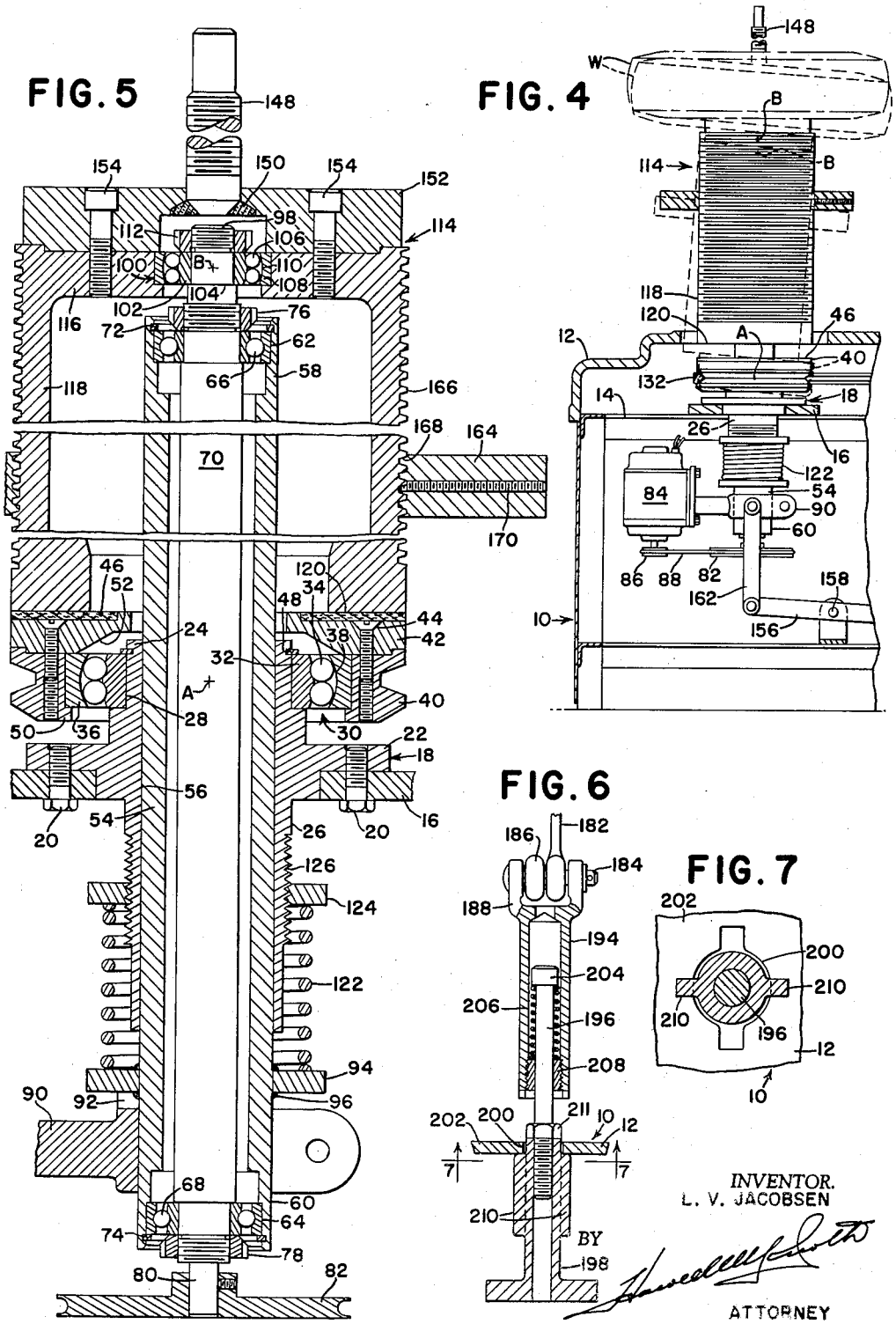

United States Patent Office 2,968,185
Patented Jan. 17, 1961

2,968,185
WHEEL BALANCING MACHINE

Le Roy V. Jacobsen, Durant, Iowa, assignor to
Bee Line Company, Bettendorf, Iowa Filed Nov. 29, 1957, Ser. No. 699,799

18 Claims. (Cl. 73—459)

This invention relates to wheel balancing machines, especially for the balancing of automobile and truck wheels when removed from the vehicle and mounted on the machine. The principles of the invention are applicable of course to the balancing of other rotatable bodies but reference herein will be had to wheels, since balancing machines for wheels are generally known and many of the fundamentals of wheel balancing are familiar to those versed in the art. However, such reference is illustrative only and not limiting. Likewise, the benefits and advantages of balanced wheels are well known and need not be elaborated here, except as such are improved by the present inventive machine and use thereof.

One of the more significant objects of the invention is an improved machine in which both static and dynamic balancing may be achieved in a similar and accurate manner. A further feature resides in a counterpoise or balance to accommodate varying inverted pendulum effects encountered in mounting wheels having differing distributions of masses. Still further, the counterpoise means features a hollow externally threaded cylinder threadedly carrying a balance ring and internally accommodating coaxial mounting and driving structure, including a rotatable shaft mounting the cylinder on a self-aligning bearing, plus means for driving the shaft to provide a virtually frictionless support for facilitating accurate static balancing. An important object entails the novel mounting of a motor on the vertically shiftable structure that engages and disengages a clutch embodied in the dynamic balancing phase of the machine. A still further significant object is a gage means driven by a wheel-mounting element and oscillated by the element when the dynamically unbalanced wheel throws the element into a "wobble," which gage is used to indicate direction and amount of dynamic unbalance so that correction can be readily effected by proper size and location of weights. Another object is means for withdrawing the gage from action during high-speed operation of the machine in initial testing for dynamic unbalance. This feature entails also the use of a safety switch which prevents operation of the high-speed drive unless the gage is disengaged, thus preventing damage to and possible destruction of the gage. Further objects reside in the use of a variable-speed drive for dynamic balancing so that various road speeds can be duplicated, and in general the provision of an overall improved, compact and economical machine.

Other objects and features, inherent in and encompassed by the invention, will become apparent as a preferred embodiment is disclosed, by way of example, in the ensuing description and accompanying sheets of drawing, the figures of which are described below.

Figure 4 is a fragmentary section like Figure 1 but showing the drive clutch disengaged and showing further in broken lines a tilted position caused by typical dynamic unbalance.

Figure 5 is an enlarged fragmentary section on the line 5—5 of Figure 1.

Figure 6 is an enlarged section on the line 6—6 of Figure 1.

Figure 7 is an enlarged section on the line 7—7 of Figure 6.

Figure 1:
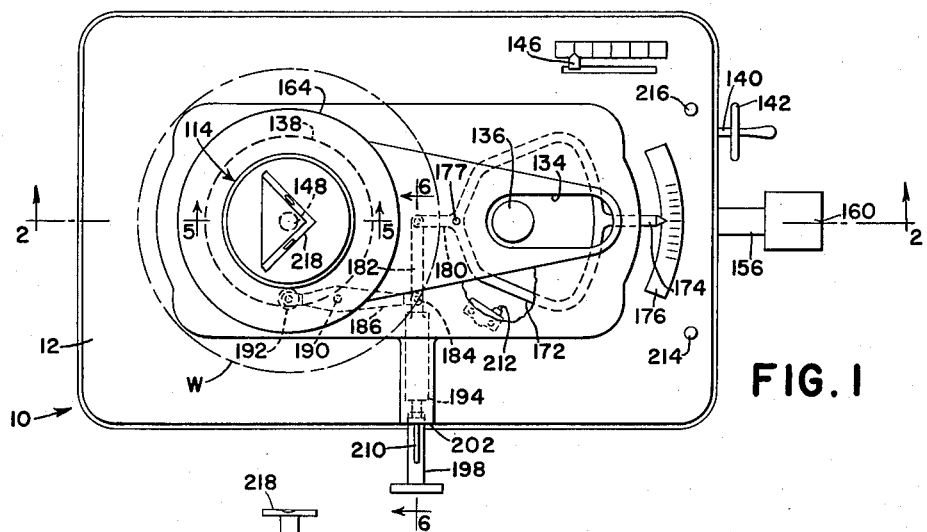
Figure 1 is a plan view of the machine, with a portion broken away, and with a wheel to be balanced shown in broken lines.

The machine, according to the presently preferred form, comprises a base 10 having a suitable upper enclosure panel 12 that is apertured to accommodate certain components to be presently described. In general, the machine follows the presently accepted pattern of balancing machines in which experience has shown that balancing and rotation of a wheel or similar body is most expeditiously accomplished about a vertical axis; although, mounting structure affording a horizontal axis, for example, is not excluded. Hence, such geographical expression as vertical, top, etc. are used by way of illustration and not by way of limitation.

Internal supporting structure, below the panel 12, is afforded by stringers or frame members 14 arranged horizontally and rigidly sustaining a disk or plate 16 which is centrally apertured to mount a tubular support 18 that establishes a vertical axis about which the basic structure is centered and with reference to which the testing of the wheel for both static and dynamic balance is achieved. Cap screws 20, for example, may be used to rigidly secure the support 18 to the disk 16 via a flange 22 integral with the support (Figure 5). The support has an upper sleeve portion 24 preferably integral therewith and extending above the flange and a lower coaxial portion such as an integral sleeve 26 projecting below the flange, and the upper portion 24 is machined to provide an annular bearing seat 28. Lower bearing means 30 seats on this seat and is shown here as comprising a seat-mounted inner race ring 32, a double row of balls 34 and an outer race ring 36, the raceway of which as at 38 is the section of a sphere formed about a point A on the axis of the seat 28 and generally in the radial plane of that seat. The outer race ring is thus self-aligning as respects the axis of the support, as would be any body carried thereby, such as a rotary drive member in the form of a ring-like sheave 40 having a parallel, coaxial ring 42 secured to its upper radial surface as by machine screws 44. A clutch element 46 of suitable clutch facing material is adhered to the top surface of the sheave ring 42. Because of the self-alining bearing 30, the sheave and ring and clutch element unit is not only journaled on the support 18 for rotation about the fixed vertical axis established by the support but is also universally rockable about the virtual point A, for reasons that will become apparent. The axial position of the bearing is maintained by a snap ring 48 and the outer race ring 36 is maintained axially with the sheave by being confined between sheave and ring shoulders 50 and 52.

An upright tube 54 is coaxially carried within and for vertical shifting relative to the support 18, being preferably arranged to have a sliding fit at 56 with the interior surface of the support, which assures accuracy in mounting and operation. This tube has upper and lower ends 58 and 60, respectively, and these project respectively above and below the upper and lower portions 24 and 26 of the support 18, being respectively recessed to afford upper and lower internal cylindrical bearing seats 62 and 64 in which upper and lower anti-friction bearings 66 and 68 are respectively received for journaling coaxially in the tube an elongated upright shaft 70. The arrangement between the bearings 66 and 68 and shaft 70 is such, as via snap rings 72 and 74 and retaining nuts 76 and 78, that the shaft is constrained for vertical axial movement with the tube, although it may of course rotate relative to the tube. The bearings contribute to the accuracy of the mounting of the shaft and tube coaxial with each other and with the support 18; and, considered broadly, the support, tube and shaft afford support means carried by and rising from the base 10; although these three components as separate members perform important functions, as will presently appear.

The lower end of the shaft 70 is extended at 80 below the lower end of the tube and has suitably affixed thereto a rotary member or sheave 82 which forms part of means for rotating the shaft. A power source, here an electric motor 84, drives a coaxial drive sheave 86 and a belt 88 to complete the shaft drive means. The motor 84 is eccentrically disposed as respects the lower end of the tube 54 and is rigidly secured to the tube via a motor mount 90 clamped or otherwise affixed to the tube. The axial location of the motor mount is assured by its engagement at 92 with a lower washer or abutment 94 coaxial with and rigidly fixed to the tube as by welding at 96. Once the washer is properly located axially on and welded to the tube, the position of the motor mount is assured and this in turn establishes horizontal alinement of the motor sheave 86 with the shaft sheave 82.

Figures 2, 3:
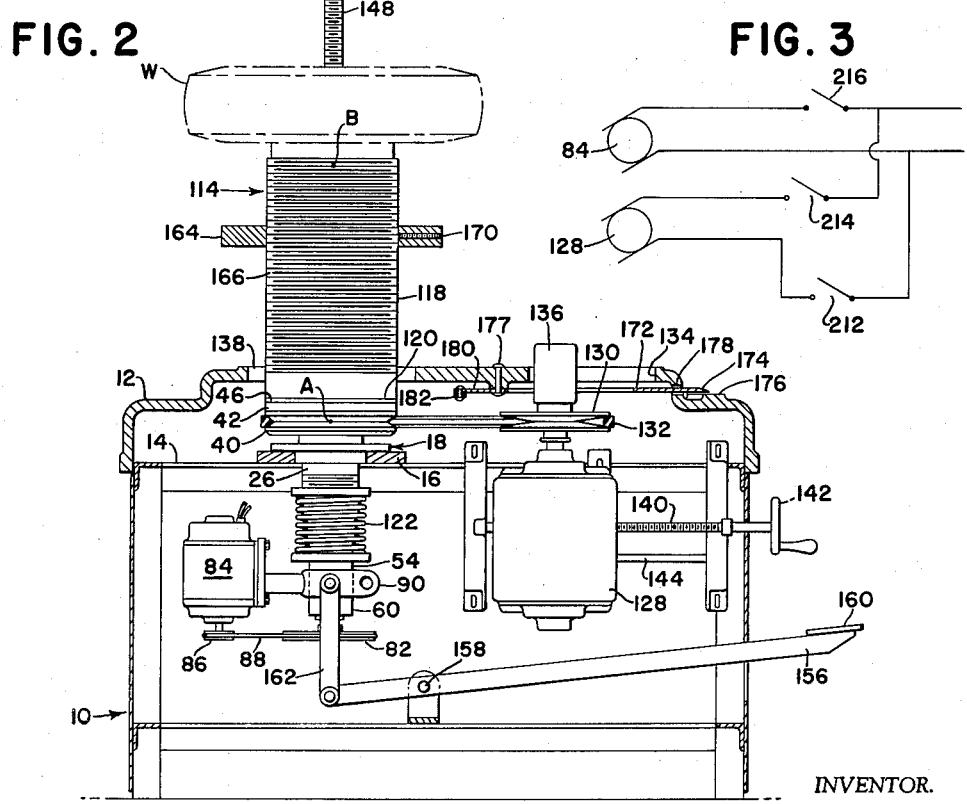
Figure 2 is a section taken generally on the line 2—2 of Figure 1.
Figure 3 is a schematic illustration of a representative electrical circuit involved in the safety connection between the high-speed drive and the dynamic gage means.

The shaft 70 has a coaxial upper, reduced extension 98 on which bearing means 100 is seated. This bearing includes an inner race ring 102, axially seated on the shaft extension 98 at 104, a double row of balls 106, and an outer race ring 108 having a raceway 110 of spherical section as respects a virtual point B on the axis of the structure and generally in the plane of the shaft extension 98. A retainer nut 112 fixes the axial position of the inner race ring, and the outer race ring 108 is universally rockable about the point B because of the spherical raceway 110. The bearing means 100 thus affords means for mounting on the virtual point B a wheel-mounting member or drum 114, here comprising an upper radial wall means or hub 116 having an integral depending annular cylindrical skirt or wall 118. This skirt has a lower terminal circular edge which provides a radial clutch element 120 engageable with and disengageable from the clutch element 46 of the drive sheave 40. The drum is normally coaxial with the shaft 70, tube 54 and support 18 and in that condition the clutch elements 46 and 120 are coaxially engaged, since the weight of the drum, shaft 70 and tube 54 is supported via the engaged clutch elements. In addition, clutch engagement is increased by the employment of biasing means in the form of a coiled compression spring 122 encircling the lower part of the tube and acting downwardly on the previously described washer or abutment 94 on the lower end of the tube and reacting upwardly against a second abutment 124 vertically adjustably carried by the depending portion 26 of the support as by being threaded thereon at 126. As will be clear, with the clutch 46—120 engaged, rotation of the sheave 40 will incur rotation of the drum 114, and for this purpose a second power means or source is provided, again preferably an electric motor 128 which drives a coaxial variable-speed sheave 130 in the horizontal plane of the sheave 40. A belt 132 is trained about the sheaves 40 and 130. The panel 12 of the base has an elongated aperture 134 for accommodating the housing 136 of the variable-speed sheave, and a further circular aperture 138 in the panel accommodates the lower part of the skirt 118 of the drum 114. Variations in speed of the drive means 130—132—40 are achieved by shifting the motor 128 back and forth relative to the sheave 40, which axially expands and contracts the sheave 130, changing its effective driving diameter. The variable-speed arrangement may be of any known type, such as that of the U.S. patent to Reeves, 1,822,935. The means for shifting the motor is here shown as a threaded rod 140 having a hand wheel 142 for moving the motor 128 along a pair or more of guide rods 144, only one of which appears in Figure 2. Thus, duplication of various road speeds can be achieved for the drum 114, reflected, as to setting of the motor 128 via the hand wheel 142, on an indicator 146 visible at the top of the panel 12 (Figure 1).

The top of the drum has means for coaxially fixing thereto a wheel W to be tested for static and dynamic balance, and for this purpose the drum has rigid thereon a coaxial upright spindle 148 centered in and welded at 150 to a mounting disk 152 which is secured to the top surface of the drum hub as by recessed machine screws 154. The typical automotive wheel comprises both the wheel body and tire and since the nature of machine mounting of wheels to be tested is well known, the details of the precise mounting are eliminated and reference will be to the wheel as such, it being deemed sufficient only to note that whatever mounting means are used to secure the wheel to the spindle 148 and drum 114 will secure rotation of the wheel and drum in unison. Thus, when the drum is rotated, whether by the motor 128 at relatively high speeds, or manually at relatively low speeds, the wheel will also rotate.

The drum 114, wheel W (when mounted on the drum), the tube 54 and shaft 70 are vertically shiftable as a unit relative to the support 18 and sheave 40, and, since the smaller motor 84 is carried by the tube, it will shift with the tube and will thus of course maintain its relation to the shaft sheave 82, which is one important feature of the invention. When the unit just described shifts upwardly it does so against the bias in the spring 122 and effects disengagement of the clutch 46—120 so that the drum may rotate independently of the sheave 40. This shifting is accomplished here by a clutch lever 156, pivoted to the base at 158 and operated by a pedal 160 to act through links 162 connected to the motor mount 90. Thus, depression of the clutch lever pedal 160 acts through the links 162 to elevate the vertically shiftable unit, and any suitable means may be utilized to temporarily retain the depressed position of the pedal so as to retain the elevated position of said unit with the clutch 46—120 disengaged.

When the drum 114 is idle and is carrying the wheel W, with the clutch 46—120 disengaged, the mass of the wheel above the upper virtual point B may cause the wheel and drum to tilt bodily to a maximum or undesirable extent, even without refernce to any static unbalance of the wheel, simply because the mass of the wheel may be too high above the point B. For the purpose of avoiding this undesirable occurrence, the invention provides novel counterbalance means, here achieved by means of a counterbalance weight or ring 164 carried by and externally of the drum 114 for selective vertical positioning on the drum and thus affording a counterbalance below the point B for countering the mass of the wheel above the point B. A simple means for accomplishing this vertical adjustment of the ring includes external threading of the drum at 166 and internal matched threading of the ring at 168. A set screw 170 radially disposed in the ring provides means for releasably securing any adjusted position of the ring.

As will be brought out below, dynamic unbalance of the mounted wheel will cause tilting of the drum about the point B so that the common axis of the wheel and drum will travel in a cone having as its altitude the axis of the shaft 70 and tube 54 and having the point B as its apex. For the purpose of reading the dynamic unbalance, the invention provides novel gage means and ties this gage means in with the control of the high-speed motor 128. As best shown in Figure 1, a gage yoke 172 has a pointer 174 readable on an arcuate index 176, preferably graduated in ounces, and this yoke is pivoted at 177 on and below the panel 12 to swing laterally. The panel is slotted at 178 (Figure 2) to permit the pointer to project externally. The yoke shape of the elment 172 is afforded to accommodate the variable-speed sheave housing 136. The yoke has an integral extension or arm 180 which is pivotally connected to a link 182, and this link has a pivotal connection at 184 in common with a follower lever 186 to a clevis 188 of means for controlling the position of the yoke as between active and inactive positions. The follower lever 186, like the gage yoke, is disposed beneath the panel 12, being pivoted thereto at 190 and having a follower roller 192 capable of riding the lower part of the skirt 118 of the drum 114 when the gage means is active. Thus, assuming the pivot 184 to be laterally yieldable, which it is as will be presently described, and the roller 192 riding the skirt of the drum, any deviation of the skirt radially from the vertical axis established by the support 18, shaft 70 and tube 54 will be reflected at the index arc 176 by the pointer as the yoke oscillates about its pivot 177.

The clevis 188 is integral with a bored member 194 which telescopically receives a plunger 196, and the plunger has a coaxial normally fixed but axially adjustable handle portion 198 which extends outwardly through a non-circular aperture 200 in a vertical wall portion 202 of the panel 12. The plunger is headed at 204 and a spring 206 is compressible between this head and an apertured plug 208 at the outer end of the bored member 194. The handle portion 198 has a pair of diametrically opposed lugs 210 and the aperture 200 is shaped as shown in Figure 7 so that the lugs may pass through the aperture or be selectively disposed either inwardly or outwardly of the wall portion 202, thus changing the position of the pivot 184 at the connection of the clevis 188 to the link 182 and follower lever 186. When the handle is in its outer position as shown in Figures 1 and 6, the lugs 210 engage outside the wall portion 202 and position the follower lever so that the roller rides the skirt of the drum 114, which, if coaxial with the support 18, etc. will dispose the pointer 174 centrally of the graduated arc 176, reflecting the exact vertical position of the drum axis. In this position of the part, the spring 206 acts to lightly bias the roller into engagement with the drum skirt 118. When the handle is turned and the lugs passed inwardly through the aperture 200 and then turned again, a jam nut 211 on the plunger 196 engages the plug 208 and picks up the member 194 to move that member inwardly so that the follower lever is rocked (counterclockwise, Figure 1) to shift the roller 192 clearly out of possible engagement with the skirt, and at the same time the gage yoke is rocked about its pivot 177 so that it swings completely to one side (clockwise as seen in Fig. 1). This is the inactive position of the gage means and when in that position it creates an interlock with the high-speed motor control means so that that motor can be energized.

A representative interlock or safety control is shown as comprising an electrical switch 212 which is open when the gage is in its active position and which becomes closed when the gage is swung as described to its inactive position. The safety switch 212 is in series with an on-off switch 214 for the high-speed motor 128, so that the circuit to the motor 128 can be completed by the switch 214 only when the switch 212 is closed. A parallel circuit for the motor 84 is shown schematically in Figure 3 as including an on-off switch 216 independent of the switches 212 and 214.

A level 218, removably mountable on the spindle 148, is illustrated as typical of means for assisting in determining static unbalance of the mounted wheel W. The use of this level and of the gage means 172—174 will appear in the ensuing description of the operation of the machine.

The wheel W is mounted coaxially on the drum 114 via the spindle 148 and whatever suitable additional means may be required and with both motors deenergized and the gage means 172 in its inactive position (handle 198 "in" as opposed to Figure 1), the clutch pedal 160 is depressed to elevate the drum and wheel via the tube 54 and shaft 70 and to disengage the clutch 46—120 (full lines, Figure 4). The clutch pedal is temporarily retained in this position. If, as stated above, the greater mass of the wheel is above the point B, the drum will tilt to one side or the other about the point B to the maximum extent permitted by the radial clearance between the inside diameter of the lower end of the skirt 118 and the tube 54. Accordingly, the counterbalance ring 164 is loosened at 170 and run down until the drum and wheel are generally counterbalanced as respects the point B, and the set screw 170 is tightened to retain the selected position of the ring. In general, one setting of the ring will suffice for all substantially similar wheels but will of course have to be changed for wheels having different mass distribution. For example, it is often necessary or desirable to test a wheel with its hub and brake drum mounted thereon and it will be readily seen that the distribution of mass will differ from that of a wheel without its hub and brake drum.

In this respect, the construction of the externally threaded drum and the location of the ring afford a simple and convenient structure, and the drum, being hollow, encloses the tube 54, shaft 70 and upper bearings 100 and 62, resulting in a compact uncluttered machine. At this point it should be noted that the external threads on the drum start at the top and terminate short of the bottom to leave a smooth annular portion for the follower roller 192 to ride on.

The small motor 84 is energized to spin the shaft 70 and the wheel and drum will remain non-rotative because of inertia. The purpose of spinning the shaft is to remove friction from the bearing means 100 so as to improve the gyroscopic characteristics at point B. If static unbalance exists in the wheel, it will of course tilt to the heavy side, which can be read, for example, on the level 218. The necessary weight, of conventional form, is added to cancel the static unbalance, and the level 218 is removed and the motor 84 is shut off.

With the wheel thus statically balanced, the clutch pedal 160 is released so that the clutch 46—120 re-engages, at which time, because of the achieved static balance, the drum 114 and sheave 40 will be coaxial and the spring load at 122 and radial friction at 46—120 will temporarily cancel the effects of the virtual points A and B. The gage means 172 remains in its inactive position, which is required to close the safety or interlock switch 212 so that the switch 214 for the high speed motor 128 can be effective. Thus, the roller 192 on the follower lever 186 is clear of the drum skirt 118. The primary reason for providing for the inactive status of the gage means is that engagement of the roller 192 with the drum during high-speed rotation of the drum would virtually destroy the roller and its bearing.

The motor 128 is set by the hand wheel 142 to the desired "road speed," read on the panel 12 at the indicator 146, and the switch 214 is closed to start the motor, resulting in high-speed rotation of the drum and wheel in unison, since the clutch 46—120 is engaged. Dynamic unbalance in the wheel will tend to cause the wheel to rotate about its own axis as distinguished from that of the shaft 70 and support 54 and, to allow the wheel to follow its own axis during high-speed rotation as just described, the clutch pedal 160 is momentarily depressed to release the clutch 46—120 and is then released to re-engage the clutch. During the short period of disengagement of the clutch, the wheel, together with the drum and point B, is elevated (full lines, Figure 4), and the vertical clearance between the clutch elements 46 and 120 frees the wheel and drum to find the true dynamic axis of the wheel if dynamically unbalanced as respects the axis of the support means 18—54—70 etc. Assuming such dynamic unbalance to exist, the wheel and drum assembly will tilt about point B and the dynamic axis thus effected will incline outwardly and downwardly from the point B (dotted lines, Figure 4). In other words, the dynamic axis of he wheel and drum will travel in a cone having the vertical axis of the support 18 etc. as its altitude and having its apex at point B; and its base will be a circle having as its center the vertical axis of the support 18 etc. Obviously, any point on this circle includes the lower end of the dynamic axis and such point is of course eccentric to the vertical axis. Since the drum skirt is concentric about the inclined axis, any point on the lower part of the skirt is also eccentric to the vertical axis.

Now, with the wheel and drum spinning about the inclined dynamic axis during disengagement of the clutch, release of the clutch pedal 160 to re-engage the clutch 46—120, results in retaining the tilted position of the drum and wheel, because as the clutch re-engages, the clutch element 120 at the bottom of the drum skirt 118 is inclined, or normal to the dynamic axis, and the energy in the rotating wheel and drum retains this position of that clutch element. Since the sheave 40 is free to rock about the virtual point A, it will assume the same angle as the clutch element 120 on the skirt, and the two elements will be parallel in engagement. However, the sheave will remain coaxial with the support 18 and thus there will be an eccentric offset between the clutch elements. This relationship is maintained because of the clutch spring 122 and radial friction between the elements 46 and 120, and the rotating assemblage may now be brought to a halt by opening the switch 214 and braking the wheel by any suitable means, which per se is conventional and therefore not shown here.

Since the vertical axis of the support 18 etc. and the tilted axis of the wheel and drum intersect at B, the wheel will have been thrown into a "wobble" because of its dynamic unbalance, and the skirt 118 of the drum will of course reflect this wobble because of its eccentricity to the vertical axis as described above. This eccentricity is exploited here to read the location and amount of dynamic unbalance, for which purpose, with the wheel and drum now stopped, the handle 198 of the gage control means is manipulated to its "out" position (Figures 1 and 6) to place the gage means in its active position so that the follower roller 192 can now ride the lower part of the drum skirt, being biased into engagement with the skirt by the control means spring 206. At the same time, active positioning of the gage means incurs opening of the safety switch 212 so that even if the switch 214 for the motor 128 should be inadvertently closed, the motor 128 cannot start.

The tilted wheel is now turned by hand, for example, which is a relatively low speed as compared with the high speed at which it is driven by the motor 128, and, as the skirt 118 orbits about the vertical axis of the support 18 etc., the follower lever 186 is rocked to oscillate the gage yoke 172 and this can be read as to direction and amount at 174—176. Using Fig. 4 as an example, the "heavy" side of the dynamic unbalance has tilted the wheel down to the right of its axis of rotation and appropriate weights are added to act during subsequent rotation of the wheel to pull the mass up to center on a horizontal plane (as repects the vertical axis of the support 18 etc.), and such weights must of course be added to diametrically opposite sides of the wheel as well as to radially opposite sides so as to retain the previously achieved static balance. The relationships between static and dynamic balance are various but an experienced operator, with the aid of the gage means 172—176, can readily ascertain the location and amounts of the weights.

After the weights have been properly added according to the foregoing, the gage means is inactively positioned, the clutch 46—120 is disengaged and then re-engaged so that the wheel and drum again become and are retained coaxial with the vertical axis of the support 18 etc., and the motor 128 is energized to drive the wheel and drum again at high speed. The clutch is then momentarily released and then engaged and the motor 128 shut off and the wheel brought to a halt. If the dynamic balance weights were properly applied according to the aforesaid procedure, the drum and sheave will be exactly coaxial, the dynamic axis and the vertical axis of the support 18 etc. will be coincident and reapplication of the gage means should result in a zero reading at 174—176.

There is thus afforded by the present invention a balancing machine for wheels and other rotating bodies that is simple, compact, efficient and accurate. Features such as the counterbalance ring, construction of the drum and mounting thereof, clutch 46—120, motor mount 90, variable-speed drive, gage means 172 and control thereof, safety interlock switch 214, and others have already been detailed and need not be further elaborated. Additional features and advantages will readily occur to those versed in the art, as will many modifications of the preferred embodiment disclosed, all of which may be readily achieved without departure from the spirit and scope of the invention.

What is claimed is:

1. In a wheel balancing machine: a base; an upright hollow support rigid on the base and having an upper annular bearing seat formed about an upright axis; a ring-like drive member concentrically disposed relative to the seat and having an upper face affording a clutch element; first self-alining bearing means mounted on the seat and journaling the drive member thereon and enabling universal rocking of said drive member about a lower virtual point on the axis of and generally in the radial plane of the seat; a tube coaxially within and vertically shiftable relative to the support and drive member and having upper and lower ends respectively above and below said drive member; a shaft coaxially journaled in and axially shiftable with the tube and having upper and lower ends respectively above and below the upper and lower ends of the tube; a coaxial drum having upper radial wall means proximate to the upper end of the shaft and a cylindrical wall loosely surrounding the tube and joined to and depending from the radial wall means to a lower terminal end affording a clutch element engageable with the clutch element on the drive member; second self-alining bearing means axially seated on the upper end of the shaft and axially supporting the drum for rotation relative to the shaft and for universal rocking of said drum about an upper virtual point on the shaft axis and adjacent to said upper end of the shaft; means on the base for driving the drive member to rotate the drum via the engaged clutch elements; means on the drum for mounting a wheel coaxially thereon above said upper virtual point; a counterbalance ring coaxially carried by the cylindrical wall of the drum and selectively axially positionable below said upper virtual point to counterbalance the weight of the wheel; means engaging the lower end of the tube to shift the tube, shaft, second bearing means and drum upwardly relative to the support and drive member to disengage the clutch elements; and means for rotating the shaft relative to the drum.

2. The invention defined in claim 1, in which: the outer surface of the cylindrical wall is threaded; and the counterbalance ring is cooperatively internally threaded and is thereby carried by the drum for selective axial positioning.

3. The invention defined in claim 2, including: means on the ring selectively engageable with and disengageable from the drum for respectively preventing and permitting rotation of the ring relative to the drum.

4. The invention defined in claim 1, in which: the means for rotating the shaft is carried by the lower end of the tube.

5. The invention defined in claim 1, in which: the means for rotating the shaft includes a rotary member fixed to the lower end of the shaft below the lower end of the tube; and a motor carried by the lower end of the tube eccentrically to the shaft and drivingly connected to said rotary member.

6. The invention defined in claim 1, including: a first abutment fixed to the support below the drive member; a second abutment fixed to the tube below the first abutment; and biasing means acting downwardly on the second abutment and reacting upwardly against the first abutment to urge the tube downwardly for engaging the clutch elements.

7. The invention defined in claim 6, in which: one of said abutments is axially adjustable relative to the other to vary the loading of the biasing means.

8. The invention defined in claim 1, in which: the means for rotating the shaft includes a rotary member fixed to the lower end of the shaft below the lower end of the tube; a motor positioned eccentrically to the lower end of the tube; a motor mount secured to said lower end of the tube and supporting the motor; means drivingly connecting the motor to the rotary member; a first abutment fixed to the support below the drive member and above the motor mount; a second abutment engaging the motor mount from above; and biasing means acting downwardly on the second abutment and reacting upwardly against the first abutment to urge the tube downwardly for engaging the clutch elements.

9. In a wheel-balancing machine: support means on a vertical axis and including coaxial bearing means affording a virtual support point on said axis; a wheel mounting member coaxially journaled on the bearing means and tiltable about said point relative to the support means; means on the member for coaxially fixing thereon a wheel to be tested for dynamic balance or unbalance; selectively connectible and disconnectible power means for rotating the member and wheel in unison at a relatively high speed so that dynamic unbalance in the wheel tilts the member and causes the common axis of the wheel and member to travel in a cone having its apex at said point; means rotatable on the support means and selectively engageable with the tilted member for securing the tilted position of the member relative to the support means while rotating and to retain said tilted position when the power means is disconnected so that the tilted member and wheel may be subsequently rotated at a relatively lower speed; gage means for determining the dynamic unbalance, including a follower selectively engageable with and disengageable from the member; means for selectively changing the follower between engaged and disengaged positions; and means responsive to the position of the follower for preventing connection of the power means when the follower is engaged with the member.

10. In a wheel-balancing machine: support means on a vertical axis and including coaxial bearing means affording a virtual support point on said axis; a wheel mounting member coaxially journaled on the bearing means and tiltable about said point relative to the support means; means on the member for coaxially fixing thereon a wheel to be tested for dynamic balance or unbalance; selectively connectible and disconnectible power means for rotating the member and wheel in unison at a relatively high speed so that dynamic unbalance in the wheel tilts the member and causes the common axis of the wheel and member to travel in a cone having its apex at said point; means for securing the tilted position of the member relative to the support means while rotating and operative to retain said tilted position when the power means is disconnected so that the tilted member and wheel may be subsequently rotated at a relatively lower speed; gage means for determining the dynamic unbalance, including a follower selectively engageable with and disengageable from the member; control means for connecting and disconnecting the power means; means for selectively engaging the follower with and disengaging the follower from the member; and means operative by the engaged follower for disabling the control means for preventing high-speed rotation of the member by the power means unless the follower is disengaged from the member.

11. In a wheel balancing machine: support means on a vertical axis and including coaxial bearing means affording a virtual support point on said axis; a wheel mounting member coaxially journaled on the bearing means and tiltable about said point relative to the support means; means on the member for coaxially fixing thereon a wheel to be tested for dynamic balance or unbalance; selectively connectible and disconnectible variable-speed power means for rotating the member and wheel in unison at selected relatively high speeds so that dynamic unbalance in the wheel tilts the member and causes the common axis of the wheel and member to travel in a cone having its apex at said point; means for securing the tilted position of the member relative to the support means while rotating and to retain said tilted position when the power means is disconnected so that the tilted member and wheel may be subsequently rotated at a relatively lower speed; gage means for determining the dynamic unbalance, including a follower selectively engageable with and disengageable from the member; means for selectively changing the follower between engaged and disengaged positions; and means responsive to the position of the follower for preventing connection of the power means when the follower is engaged with the member.

12. In a wheel balancing machine: a base; an upright hollow support rigid on the base; a ring-like drive member concentrically disposed relative to the support and having an upper face affording a clutch element; bearing means coaxially journaling the drive member on the support; a tube coaxially within and vertically shiftable relative to the support and drive member and having upper and lower ends respectively above and below said drive member; a shaft coaxially journaled in and axially shiftable with the tube and having upper and lower ends respectively above and below the upper and lower ends of the tube; a coaxial drum having upper radial wall means proximate to the upper end of the shaft and a cylindrical wall loosely surrounding the tube and joined to and depending from the radial wall means to a lower terminal end affording a clutch element engageable with the clutch element on the drive member; means on the upper end of the shaft and supporting the drum for rotation relative to the shaft and for universal rocking of said drum about an upper virtual point on the shaft axis and adjacent to said upper end of the shaft; means on the base for driving the drive member to rotate the drum via the engaged clutch elements; means on the drum for mounting a wheel coaxially thereon above said upper virtual point; a counterbalance ring coaxially carried by the cylindrical wall of the drum and selectively axially positionable below said upper virtual point to counterbalance the weight of the wheel; means engaging the lower end of the tube to shift the tube, shaft and drum upwardly relative to the support and drive member to disengage the clutch elements; and means for rotating the shaft relative to the drum.

13. In a wheel balancing machine: a base; an upright hollow support rigid on the base; a ring-like drive member concentrically disposed relative to the support and having an upper face affording a clutch element; bearing means coaxially journaling the drive member on the support; a tube coaxially within and vertically shiftable relative to the support and drive member and having upper and lower ends respectively above and below said drive member; a shaft coaxially journaled in and axially shiftable with the tube and having upper and lower ends respectively above and below the upper and lower ends of the tube; a wheel mounting drum having a hub proximate to the upper end of the shaft and a depending annular wall loosely surrounding the tube and joined coaxially to the hub and having a lower terminal end affording a clutch element engageable with the clutch element on the drive member; means on the upper end of the shaft and supporting the drum for rotation relative to the shaft and for universal rocking of said drum about an upper virtual point on the shaft axis and adjacent to said upper end of the shaft; means on the base for driving the drive member to rotate the drum via the engaged clutch elements; means on the drum for mounting a wheel coaxially thereon above said upper virtual point; means engaging the lower end of the tube to shift the tube, shaft and drum upwardly relative to the support an drive member to disengage the clutch elements; and means for rotating the shaft relative to the drum.

14. The invention defined in claim 13, in which: the means for rotating the shaft is carried by the lower end of the tube.

15. The invention defined in claim 13, in which: the means for rotating the shaft includes a rotary member fixed to the lower end of the shaft below the lower end of the tube; and a motor carried by the lower end of the tube eccentrically to the shaft and drivingly connected to said rotary member.

16. In a wheel balancing machine: a base; support means on and rising from the base on a vertical axis and having an upper end portion; a wheel mounting and carrying member having a hub centered on said upper end portion and an annular portion depending from the hub and coaxial therewith in normally concentric relation to said vertical axis; bearing means journaling the hub on said upper end portion of the support means and affording a virtual support point about which the member is universally rockable so that the axis of the member intersects said vertical axis at said point; means on the member for fixedly mounting coaxially thereon a wheel to be tested for dynamic balance or unbalance; means including a power source for rotating the member and mounted wheel in unison so that dynamic unbalance in the wheel tilts the member and causes its axis to travel in a cone having its apex at said point; means rotatable on the support means and selectively engageable with the tilted member for securing and temporarily retaining the tilted position of the member relative to the support means; means for gaging the dynamic unbalance of the mounted wheel, including a follower movably carried by the base and riding the annular portion of the member and an indicator responsive to said follower; selective means changeable between first and second positions for respectively engaging and disengaging the follower relative to the annular portion; control means for activating and deactivating the power source; and disabling means connected to the control means and operative in response to changing of the selective means to its first position for disabling the control means and operative when the selective means is in its second position to effectuate the control means.

17. In a wheel balancing machine: a base; support means on and rising from the base on a vertical axis and having an upper end portion; a wheel mounting and carrying member having a hub centered on said upper end portion and an annular portion depending from the hub and coaxial therewith in normally concentric relation to said vertical axis; bearing means journaling the hub on said upper end portion of the support means and affording a virtual support point about which the member is universally rockable so that the axis of the member intersects said vertical axis at said point; means on the member for fixedly mounting coaxially thereon a wheel to be tested for dynamic balance or unbalance; means including a power source for rotating the member and mounted wheel in unison so that dynamic unbalance in the wheel tilts the member and causes its axis to travel in a cone having its apex at said point; means rotatable on the support means and selectively engageable with the tilted member for securing and temporarily retaining the tilted position of the member relative to the support means; means for gaging the dynamic unbalance of the mounted wheel, including a follower movably carried by the base and riding the annular portion of the member and an indicator responsive to said follower; selective means changeable between first and second positions for respectively engaging and disengaging the follower relative to the annular portion; and means connected to the power source and having a connection to the follower operative to disable the power source whenever the follower is engaged with the annular portion and to effectuate said power source when the follower is disengaged from the annular portion.

18. In a wheel balancing machine: a base; an upright hollow support rigid on the base and having an upper annular bearing seat formed about an upright axis; a ring-like member concentrically disposed relative to the seat and having an upper face affording a clutch element; first self-alining bearing means mounted on the seat and journaling the member thereon and enabling universal rocking of said member about a lower virtual point on the axis of and generally in the radial plane of the seat; a tube coaxially within and vertically shiftable relative to the support and member and having upper and lower ends respectively above and below said member; a shaft coaxially journaled in and axially shiftable with the tube and having upper and lower ends respectively above and below the upper and lower ends of the tube; a coaxial wheel carrier element having upper radial wall means proximate to the upper end of the shaft and an annular wall loosely surrounding the tube and joined to and depending from the radial wall means to a lower terminal end affording a clutch element engageable with the clutch element on the member; second self-alining bearing means axially seated on the upper end of the shaft and axially supporting the carrier for rotation relative to the shaft and for universal rocking of said carrier about an upper virtual point on the shaft axis and adjacent to said upper end of the shaft; means on the base for driving the ring-like member to rotate the carrier when the clutch elements are engaged; means on the carrier for mounting a wheel coaxially thereon above said upper virtual point; a counterbalance ring coaxially carried by the annular wall of the carrier and selectively axially positionable below said upper virtual point to counterbalance the weight of the wheel; means engaging the lower end of the tube to shift the tube, shaft, second bearing means and carrier upwardly and downwardly relative to the support and ring-like member to disengage and engage the clutch elements; and means for rotating the shaft relative to the carrier.

References Cited in the file of this patent

UNITED STATES PATENTS

| Number | Name | Date |
|---|---|---|
| 360,807 | Huntley | Apr. 5, 1887 |
| 1,136,611 | Pomeroy | Apr. 20, 1915 |
| 2,130,122 | Dybvig | Sept. 13, 1938 |
| 2,298,656 | Smith | Oct. 13, 1942 |
| 2,412,473 | Schnoebelen | Dec. 10, 1946 |
| 2,526,484 | Jacobsen et al. | Oct. 17, 1950 |
| 2,792,725 | Lannen | May 21, 1957 |